Jan. 19, 1954 C. E. HUNT, JR 2,666,807

TAPE FACSIMILE APPARATUS

Filed Sept. 17, 1949 2 Sheets-Sheet 1

CLAYTON E. HUNT, JR.
INVENTOR

BY Daniel J. Mayne
Rolla N. Carter
ATTORNEYS

Jan. 19, 1954 C. E. HUNT, JR 2,666,807

TAPE FACSIMILE APPARATUS

Filed Sept. 17, 1949 2 Sheets-Sheet 2

CLAYTON E. HUNT, JR.
INVENTOR

BY Daniel J. Mayne
Rolla N. Carter
ATTORNEYS

Patented Jan. 19, 1954 2,666,807

UNITED STATES PATENT OFFICE 2,666,807

TAPE FACSIMILE APPARATUS

Clayton E. Hunt, Jr., Rochester, N. Y., assignor to Eastman Kodak Company, Rochester, N. Y., a corporation of New Jersey Application September 17, 1949, Serial No. 116,360

4 Claims. (Cl. 178—6.6)

The present invention relates to facsimile apparatus and more particularly to such apparatus with which recording may be made on a continuous strip of material, sometimes called tape recording.

The preferred embodiment of the invention to be described in detail is an apparatus for reproducing on a paper tape printed subject matter, such as addresses, carried by business record cards or other discrete documents. Such record cards generally contain their information in the form of perforations arranged in a predetermined manner. These cards, especially those representing the subscription list of a periodical, have printed on their backs the name, address and subscription expiration of the subscriber to whom the card relates. This printed information usually occupies four lines between rows of perforations.

One specific use of apparatus to which the invention is applicable is the production of address labels from business card originals, these labels being recorded one after another on an endless tape to provide a so-called dick strip for use in addressing magazines. When it is remembered that some publishers face the problem of addressing up to several million magazines each week, it becomes obvious that great speed is a very desirable quality in any apparatus employed for this purpose. Accordingly, it is an object of the invention to provide facsimile apparatus which will produce address labels in dick strip form from addresses printed on business cards at a greater rate than heretofore possible.

Another object of the invention is to provide such apparatus which is accurate, simple and efficient.

In general, the invention contemplates the use of facsimile apparatus of the general type disclosed in copending application Serial No. 22,683 filed April 22, 1948 by Russell G. Thompson, now Patent No. 2,529,978, but is not limited thereto. In that application two or more portions of an original are scanned simultaneously and the independent signals derived therefrom are employed to actuate independent printing bars alined in recording relation adjacent a cylinder having as many helical ridges as there are printer bars.

In accordance with the present invention, separate portions of the original to be reproduced are scanned at separate times at separate stations and are recorded at separate stations, the two partial scannings and the two partial recordings being complemental. Also, while the second partial scanning is taking place, a first partial scanning and recording of another original is being accomplished. This arrangement contributes to the accuracy of the apparatus and presents many advantages from the standpoint of design.

The invention will be best understood by reference to the accompanying drawings in which.

Figures 1, 2, 4:
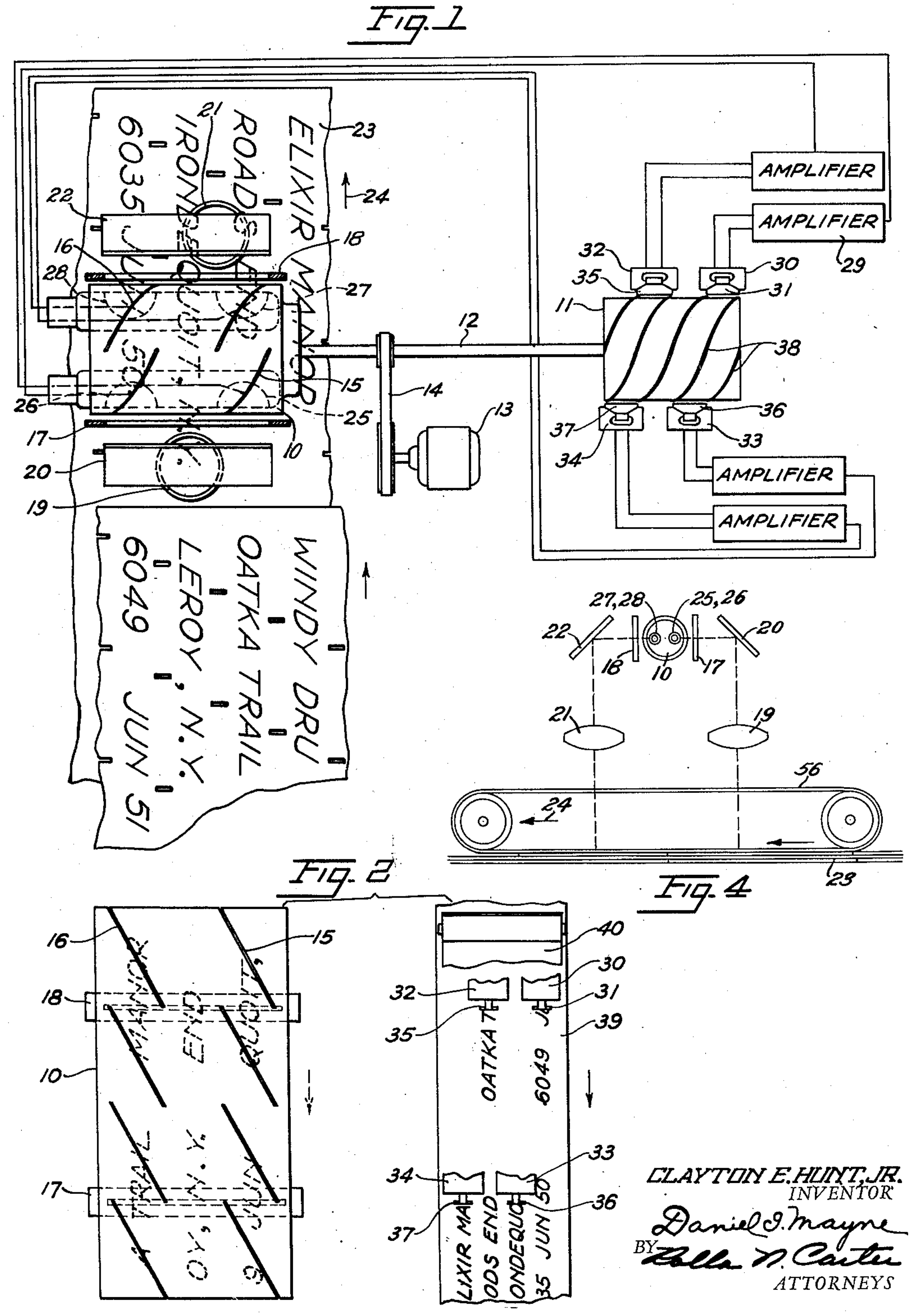
Fig. 1 is a fragmentary view of a facsimile apparatus for partial scanning and recording.
Fig. 2 is a view showing developments of the scanning drum and its relation to images scanned and of the printing bars and their relation to the recording medium.
Fig. 4 is a diagrammatic view showing the relation of the optical system with respect to the scanning drum and the object plane through which the cards are moved successively.

The apparatus illustrated for the purpose of describing the invention is of the same general type as that disclosed in the above-identified application filed by Russell G. Thompson and includes a pick-up scanning drum 10 and a recording cylinder 11 mounted on a common shaft 12 and adapted to be rotated at a high speed by a motor 13 through a suitable power transmitting means such as a belt 14. The drum 10 is provided with two axially spaced circumferential rows of helical slots 15 and 16. Diametrically positioned aperture plates 17 and 18 cooperate with the helical slots 15 and 16 to define elemental scanning areas which move progressively in an axial direction when the drum 10 rotates. An optical system which may comprise an objective lens 19 and a mirror 20 is arranged to image its object plane in the plane of the aperture 17 and a similar optical system comprising an objective lens 21 and a mirror 22 is arranged to image its object plane in the plane of the aperture 18. The object planes of these two optical systems occupy a common plane so that when an original such as a card 23 is positioned in this common plane two longitudinally separated transverse areas of the card 23 are imaged on the apertures 17 and 18, respectively, and movement of the card 23 in the longitudinal direction indicated by an arrow 24 will cause each transverse area of the card 23 to be imaged successively on the apertures 17 and 18. The portions of the object planes of the lenses 19 and 21 which are imaged on the apertures 17 and 18 are hereinafter called stations.

The axial length of the helical slots 15 and 16 is slightly greater than the height of a line of print on the card 23 (assuming 1:1 magnification by the lenses 19 and 21) and their axial spacing equals the spacing of alternate lines of print on the card 23 so that as the card 23 moves through the first station its first and third lines of print are imaged on the aperture 17 in position to be scanned by the helical slots 15 and 16, respectively. The arrangement of the lens 21 and the mirror 22 is such that when the card 23 moves through the second station, its second and fourth lines of print are imaged on the aperture 18 in position to be scanned also by the helical slots 15 and 16. Light sensitive cells 25 and 26 are provided to derive signals representative of the scansion values of the first and third lines of print, respectively. Similarly, light sensitive cells 27 and 28 derive signals representative of the scansion values of the second and fourth lines of print, respectively.

As shown in Fig. 1, lens 21 is positioned centrally of the lines to be copied whereas lens 19 is displaced transversely of the direction of card movement so that its optical axis is aligned with the center of the second line to be copied. It is well known that displacement of a lens in the same plane also displaces its image in the same direction and in the same plane. As a result, the displacement of lens 19 is made so that the images of the first and third lines bear the same relation to helical slots 15 and 16 as the images of the second and fourth lines from lens 21. Since the spacing of said helical slots is equivalent to the spacing of alternate lines and the photocells are aligned with the slots, only alternate lines are imaged in relation to slots 15 and 16 and the unwanted lines are imaged between and beyond the slots and photocells.

The photoelectric means 25 has its output fed into an amplifier 29 which feeds to the winding of an electromagnetic driver 30 adapted to actuate a printer bar 31. Similarly, the outputs from the photoelectric means 26, 27 and 28 are fed through amplifiers to the winding of electromagnetic drivers 32, 33 and 34, respectively, which actuate printer bars 35, 36 and 37. It will be noted that the printer bars 31 and 35 are spaced circumferentially and axially from the printer bars 36 and 37 with respect to the recording cylinder 11 so that each of these printer bars spans a separate circumferential band of the cylinder 11.

The recording cylinder 11 carries helical ridges 38 correlated in number and pitch with the helical slots 15 and 16 in the scanning drum 10 so that all of the printer bars 31, 35, 36 and 37 are simultaneously scanned in proper phase with their actuating signals. As will be described below, a recording tape is drawn between the printer bars 31 and 35 and the cylinder 11 and then between the printer bars 36 and 37 and the cylinder 11 with a length of the tape in between corresponding to the separation of the two stations at the scanning drum 10.

The relationship between the images being scanned and their reproduction by the printer bars will be apparent from Fig. 2 which shows developments of these parts. Both the images and the tape 39 move in the direction indicated by the arrows. A card at the first station is imaged on the aperture 17 while a card at the second station is imaged on the aperture 18. Scansion values derived from slots 15 and aperture 17 are recorded by the printer bar 31 to reproduce the bottom line of the four line original.

The third line which is scanned by slots 16 and aperture 17 is reproduced by the printer bar 35. Similarly, the second and fourth lines scanned, respectively, by the slots 15 and 16 and the aperture 18 are reproduced by the printing bars 36 and 37. A ribbon of carbon paper 40 for marking the tape 39 is shown torn away to expose the recorded matter. While movable printing bars for carbon paper recording have been described, other well known recording instrumentalities may be employed for marking the tape in accordance with the received signals.

Figure 3:
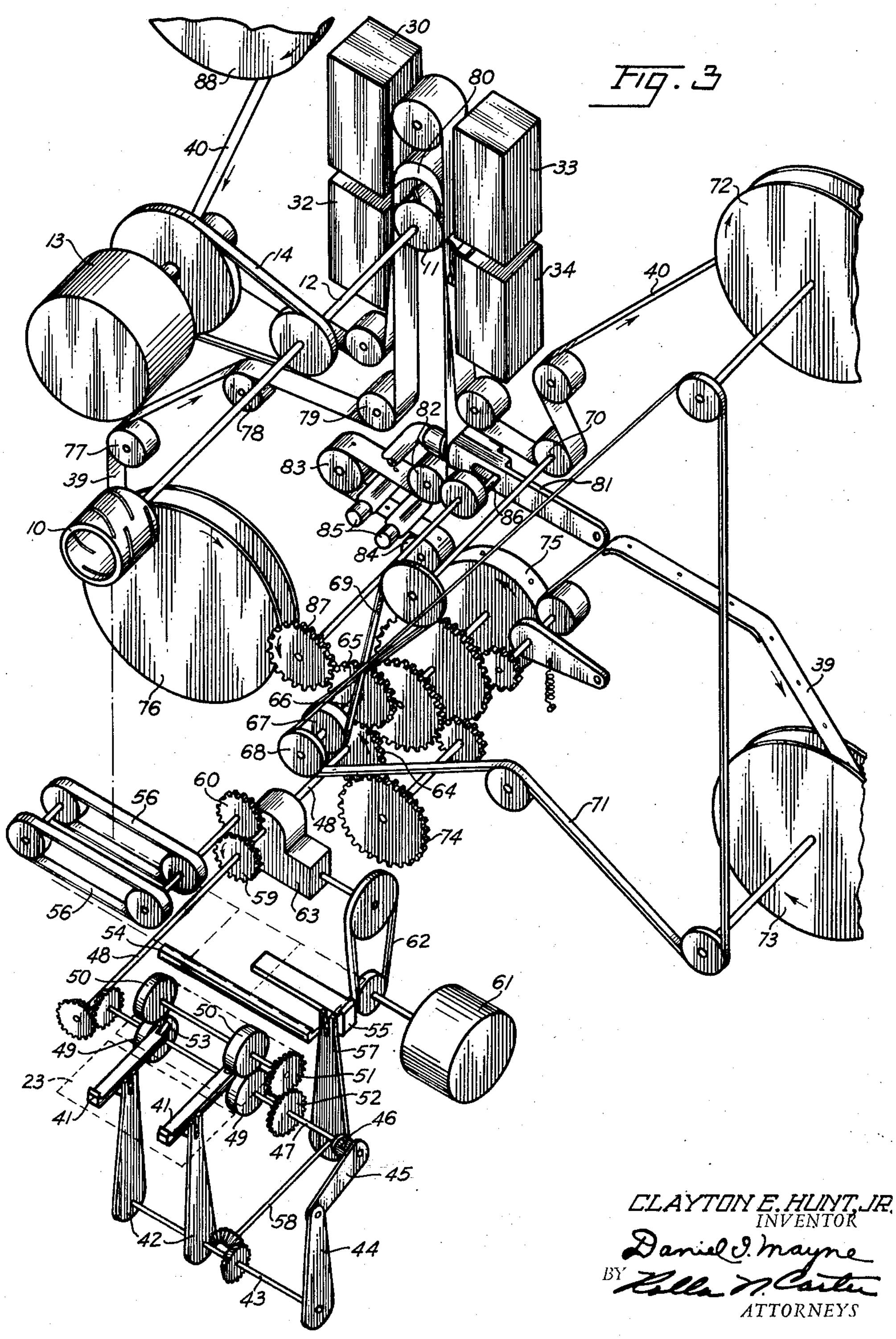
Fig. 3 is a perspective view of the moving parts of a complete apparatus.

The moving parts of a complete facsimile copying apparatus with which the invention has been employed are shown in Fig. 3 and are described and claimed in copending application Serial No. 116,310, filed September 17, 1949, by Russell G. Thompson. A suitable control circuit arrangement for operating this copying apparatus is described and claimed in my copending application Serial No. 116,359, filed September 17, 1949.

Referring to Fig. 3 where the same reference numerals of Figs. 1 and 2 are applied to like parts, the cards 23 are fed one at a time from the bottom of a stack by pickers 41 which are oscillated back and forth by arms 42 carried by a shaft 43 which is rotated back and forth by an arm 44 connected by a crank 45 to an eccentric 46 which is rotated by a shaft 47 connected through gearing to a main drive shaft 48. The shaft 47 carries feed rollers 49 which resiliently bear against cooperating feed rollers 50 driven through gears 51 and 52 by the shaft 47.

The cards 23 are fed sidewise into the bite of the rollers 49 and 50 and as the trailing edge of a card leaves these rollers it is engaged by pushers 53 carried by the picker bars 41 and moved onto a conveyor track 54. The pushers 53 are preferably biased to raised position so that upon their return movement they will be depressed by the overlying cards. A card thus fed to the conveyor track 54 is moved lengthwise by a reciprocating pusher 55 to be engaged by traveling belts 56 which convey the card through the scanning stations of the pickup scanner 10 after which the card is discharged. The pusher 55 is reciprocated in synchronism with the feeding of the cards 23 by a rocker arm 57 carried on a shaft 58 which is geared to the shaft 43. Since the subject matter to be copied appears entirely on one half of the length of a card, the cards are fed with this half toward the scanning stations with successive cards overlapping the trailing half of preceding cards to prevent lost scanning time.

The card conveying belts 56 are driven by the main shaft 48 directly and through gears 59 and 60. The main drive shaft 48 is driven by a motor 61 through a belt 62 and a gear box 63. The right end of the main drive shaft 48 carried a gear 64 which meshes with a gear 65 mounted on a shaft 66 provided with two pulleys or sprockets 67 and 68. The member 67 by means of a belt or chain 69 drives a rubber covered roller 70 to advance the carbon paper strip 40 while the member 68 by means of a belt or chain 71 drives takeup reels 72 and 73 for the carbon paper strip 40 and the recording paper tape 39, respectively. The reels 72 and 73 are preferably driven by suitable constant tension devices not shown.

The gear 64 on the main drive shaft 48 also drives through a gear train, starting with a gear 74, a sprocket drum 75 for advancing the recording paper tape 39. This sprocket 75 pulls the paper tape 39 from a supply reel 76 over idler rollers 77, 78 and 79, then upwardly between the helix cylinder 11 and recording devices 30 and 32 and over a stationary guide 80, then downwardly between the helix cylinder 11 and recording devices 33 and 34 and past a flying punch 81 where it is perforated. The paper tape 39 is then trained over rollers 82, 83 and 84 which guide it past heating lamps 85 and seats it on the sprocket drum 75.

The flying punch 81 is actuated by an eccentric pin 86 driven by a gear 87 in mesh with the gear 65. The arrangement is such that the perforations made in the tape 39 by the flying punch 81 register with the teeth of the sprocket drum 75.

The driven roller 70 draws the carbon paper strip from a supply reel 88 and serially past both recording stations where it overlies the paper tape 39 in recording relationship. The speed of the roller 70 is such as to advance the carbon strip 40 at a slower rate than the paper tape 39 is advanced for efficient use of the carbon transfer material.

The length of the paper tape 39 between the two recording stations is determined by the position of the guide 80 and this length corresponds to the distance between the two stations scanned by the drum 10.

It will be apparent from the foregoing that the invention simplifies the design of high speed tape facsimile apparatus and improves the accuracy and speed obtainable. Various modifications will suggest themselves to those skilled in the art without departing from the scope of the invention as defined in the appended claims.

What I claim as new and desire to secure by Letters Patent of the United States is:

1. In tape facsimile apparatus for copying from a perforated business card subject matter appearing thereon in spaced parallel areas, means for moving the card in a direction parallel to said areas and through two stations spaced in the direction of movement, a single scanner drum having a helical slot, a pair of scanning apertures positioned adjacent the drum and spaced circumferentially thereof, means at the first station for imaging one of said areas on one of said apertures in scanning relationship, means at the second station for imaging the adjacent area on the other of said apertures in scanning relationship, means associated with said slot and apertures for deriving signals representative of the scansion values of said areas, a recording cylinder having a helical ridge, two printer bars positioned adjacent the recording cylinder and spaced circumferentially and axially thereof, means for drawing a recording medium between the recording cylinder and each of the printer bars and with a loop inbetween having a length corresponding to the separation of the two stations, and means operatively connected to said signal deriving means for actuating each printer bar in accordance with scansion values of a single image whereby complete reproduction of the spaced areas is accomplished in two successive stages.

2. Apparatus in accordance with claim 1 wherein card feeding means introduce cards successively, one after another, to the card moving means whereby partial scanning and reproduction of a card in each station takes place simultaneously.

3. In facsimile apparatus a single scanning drum having a helical slot, means defining two linear apertures spaced around the periphery of the drum and associated in scanning relation with said slot, two spaced stations, means for moving an original successively through said stations, means for imaging a portion of the original when in one station on one of said apertures, means for imaging another portion of the original when in the other station on the other of said apertures, whereby the helical slot is common to two scanning operations, and means associated with said slot and apertures for deriving signals representative of the values of each scansion.

4. Facsimile apparatus for producing a dick strip of address labels from a series of discrete documents each bearing a printed address in four parallel lines comprising two spaced scanning stations, means for feeding the documents one at a time serially through said stations, means at the first station for scanning elemental areas of two non-adjacent lines of the printed address, means at the second station for scanning elemental areas of the other two lines of the printed address, a separate recording device associated with said scanning means and controlled by the scansion values of each line of the printed address, and means for advancing a record receiving tape past the recording devices, the location of the recording devices with respect to the area of the tape being correlated to the spacing of said stations so that a recorded address is collocated as on the document.

CLAYTON E. HUNT, Jr.

References Cited in the file of this patent

UNITED STATES PATENTS

| Number | Name | Date |
|---|---|---|
| 1,751,584 | Hansell | Mar. 25, 1930 |
| 1,807,012 | Ranger | May 26, 1931 |
| 1,934,753 | Wildhaber | Nov. 14, 1933 |
| 1,990,544 | Gray | Feb. 12, 1935 |
| 2,213,876 | Young | Sept. 3, 1940 |
| 2,215,806 | Young | Sept. 24, 1940 |
| 2,386,263 | Ridings et al. | Oct. 9, 1945 |
| 2,443,953 | Gillespie | June 22, 1948 |
| 2,510,200 | Thompson | June 6, 1950 |
| 2,529,978 | Thompson | Nov. 14, 1950 |